US007495602B2

(12) United States Patent
Sandell et al.

(10) Patent No.: US 7,495,602 B2
(45) Date of Patent: Feb. 24, 2009

(54) SINGLE AIR TRAFFIC CONTROL (ATC) OPERATOR INTERFACE

(75) Inventors: Gordon R. Sandell, Bothell, WA (US); Stephen Y. Lee, Shoreline, WA (US); William M. Fischer, Port Orchard, WA (US); Bradley D. Cornell, Lake Stevens, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 11/552,818

(22) Filed: Oct. 25, 2006

(65) Prior Publication Data

US 2007/0129854 A1 Jun. 7, 2007

Related U.S. Application Data

(60) Provisional application No. 60/741,852, filed on Dec. 2, 2005.

(51) Int. Cl.
*G01S 13/00* (2006.01)
*G01C 23/00* (2006.01)
*G06F 19/00* (2006.01)
*G06G 7/70* (2006.01)

(52) U.S. Cl. ................................ 342/37; 701/3; 701/15; 701/16

(58) Field of Classification Search ..................... 701/3, 701/15, 16; 342/37
See application file for complete search history.

(56) References Cited

U.S. PATENT DOCUMENTS 5,835,059 A * 11/1998 Nadel et al. ................. 342/398
6,275,767 B1 * 8/2001 Delseny et al. .............. 701/120
6,278,396 B1 * 8/2001 Tran ............................ 342/29
6,353,779 B1 * 3/2002 Simon et al. .................... 701/3
6,552,669 B2 * 4/2003 Simon et al. ................ 340/945
7,047,112 B2 * 5/2006 Riedel et al. .................... 701/3
2005/0181787 A1 * 8/2005 Judd et al. .................. 455/431
2007/0159356 A1 * 7/2007 Borel et al. ................. 340/945

FOREIGN PATENT DOCUMENTS

EP 1318492 A2 6/2003
WO WO02099769 A1 12/2002

OTHER PUBLICATIONS

PCT Intl Search Report and Written Opinion for Application No. PCT/US2006/045742, dated Apr. 18, 2007, 13 pages.

(Continued)

*Primary Examiner*—Thomas H Tarcza
*Assistant Examiner*—Harry Liu
(74) *Attorney, Agent, or Firm*—Lee & Hayes, PLLC

(57) ABSTRACT

Systems and methods for communication using a plurality of data link standards through a common operator interface are disclosed. In one embodiment, the system includes components configured to select and establish communication with an air traffic control center using one of a plurality of data link standards. The system further includes components configured to format at least one downlink page to only allow appropriate data inputs based on one or more functionalities of the data link standard, and encode one or more entered data inputs based on the selected data link standard and transmit the inputs to the air traffic control center. In a particular embodiment, the system further includes a components configured to receive and display each of the decoded uplink data transmission in a text message on a corresponding uplink display page according to one or more message text conventions of the selected data link standard.

20 Claims, 8 Drawing Sheets

OTHER PUBLICATIONS

Signore et al., "A Simplified Aeronautical Telecommunication Network (ATN) Avionics Architecture", Digital Avionics Systems Conf, Oct./Nov. 1998, Proceedings 17th DASC, The AIAA/IEEE/SAE, 5 pgs.

Signore et al, "The Aeronautical Telecommunication Network (ATN)", Military Communications Conf, Oct. 1998, MILCOM 98, Proceedings, IEEE Boston, MA, 5 pages.

Sandell, "Datalink on the 787 Airplane," ATN 2005, Sep. 20, 2005, 43 pages, London.

* cited by examiner

700

| Msg# | FANS Text | ATN Text |
|---|---|---|
| 20 | CLIMB TO AND MAINTAIN altitude | *CLIMB TO level* |
| 21 | AT time CLIMB TO AND MAINTAIN altitude | AT time CLIMB TO level |
| 22 | AT position CLIMB TO AND MAINTAIN altitude | AT position CLIMB TO level |
| 23 | DESCEND TO AND MAINTAIN altitude | *DESCEND TO level* |
| 24 | AT time DESCEND TO AND MAINTAIN altitude | AT time DESCEND TO level |
| 25 | AT position DESCEND TO AND MAINTAIN altitude | AT position DESCEND TO level |
| 73 | predepartureclearance | departureclearance |
| 96 | FLY PRESENT HEADING | *CONTINUE PRESENT HEADING* |
| 125 | SQUAWK ALTITUDE | SQUAWK MODE CHARLIE |
| 126 | STOP ALTITUDE SQUAWK | STOP SQUAWK MODE CHARLIE |
| 131 | REPORT REMAINING FUEL AND SOULS ON BOARD | REPORT REMAINING FUEL AND PERSONS ON BOARD |
| 132 | CONFIRM POSITION | REPORT POSITION |
| 133 | CONFIRM ALTITUDE | REPORT PRESENT LEVEL |
| 134 | CONFIRM SPEED | REPORT speedtype speedtype speedtype SPEED |
| 135 | CONFIRM ASSIGNED ALTITUDE | CONFIRM ASSIGNED LEVEL |
| 145 | CONFIRM HEADING | REPORT HEADING |
| 146 | CONFIRM GROUND TRACK | REPORT GROUND TRACK |
| 166 | DUE TO TRAFFIC | DUE TO traffictype TRAFFIC |

FIG. 7

SINGLE AIR TRAFFIC CONTROL (ATC) OPERATOR INTERFACE

CROSS REFERENCE TO RELATED APPLICATIONS

This patent application claims priority from commonly-owned U.S. Provisional Application No. 60/741,852 entitled “Single ATC Operator Interface” filed on Dec. 2, 2005, which provisional application is incorporated herein by reference.

FIELD OF THE INVENTION

This invention relates to systems and methods for air traffic control, and more specifically, to systems and methods for communication using a plurality of different air traffic control data link standards via a common operator interface.

BACKGROUND OF THE INVENTION

Air Traffic Control data links presently use two generally incompatible technologies, Future Air Navigation System (FANS), which is used in oceanic and remote airspace, and Aeronautical Telecommunications Network (ATN), which is used in continental Europe and potentially in other congested domestic environments. Typically, an aircraft system is either equipped with the FANS data link technology and associated operator interface, or the ATN data link technology and associated operator interface.

Although desirable results have been achieved using such prior art systems, there may be room for improvement. For example, the incompatible nature of these systems and the current capability to implement only a single data link technology on an aircraft preclude the aircraft from having both types of air traffic control data link available for use during different phases of a flight. Moreover, because FANS and ATN technologies utilize different operator interfaces, aircrews must be trained in both systems rather than in a single system. Therefore, novel systems and methods which minimize training time and facilitate the use of multiple air traffic control data link technologies during different phases of a flight would be highly desirable.

SUMMARY OF THE INVENTION

The present invention is directed to systems and methods for communication using a plurality of incompatible air traffic control technologies through a single operator interface. Embodiments of systems and methods in accordance with the present invention may advantageously provide systems and methods for communication using a plurality of different air traffic control data link standards through a common operator interface, and allow implementation of multiple air traffic control data link technologies on a single aircraft, and may reduce aircrew training time, in comparison with the prior art.

In one embodiment, a system for communication via a plurality of data link standards includes a selector component configured to select one of a plurality of data link standards for communication with an air traffic control center, and an initiator component configured to establish communication with the air traffic control center using the selected data link standard. The system is further equipped with an adapter component configured to format at least one downlink page to only allow appropriate data inputs based on one or more functionalities of the data link standard. The system also possesses an encoder component configured to encode one or more entered data inputs based on the selected data link standard. Lastly, the system is equipped with a transmitter component configured to transmit the one or more encoded data inputs to the air traffic control center.

In a particular embodiment, the selector component is configured to select one of the Future Air Navigation System (FANS) data link standard and the Aeronautical Telecommunications Network (ATN) data link standard to establish communication with an air traffic control center. In an alternate embodiment, the system further possesses a receiver component configured to receive one or more uplink data transmissions encoded by the selected data link standard from the air traffic control center, and a decoder component configured to decode the one or more uplink data transmissions based on the selected data link standard. The system is also equipped with a display component configured to display each of the decoded uplink data transmissions in a text message on a corresponding uplink display page according to one or more message text conventions of the selected data link standard.

BRIEF DESCRIPTION OF THE DRAWINGS

Embodiments of the present invention are described in detail below with reference to the following drawings.

FIG. 7 is a representative table of uplink message elements showing the textual differences due to the different conventions of the FANS data link standard and the ATN data link standard.

DETAILED DESCRIPTION

The present invention relates to systems and methods for communication using a plurality of different air traffic control technologies through a single operator interface. Many specific details of certain embodiments of the invention are set forth in the following description and in FIGS. 1-8 to provide a thorough understanding of such embodiments. The present invention may have additional embodiments, or may be practiced without one or more of the details described below.

Generally, embodiments of the present invention provide systems and methods for communication using a plurality of different air traffic control data link technologies through a common operator interface. The systems and methods advantageously select one of a plurality of data link standards and establish communication with an air traffic control center, then encode downlink data entered by an operator based on a selected data link standard for transmission to an air traffic control center. The systems and methods also decode uplink data transmissions received from an air traffic control center based on the selected data link standard for display. Thus, embodiments of the invention advantageously allow implementation of multiple air traffic control data link technologies on a single aircraft, and may reduce aircrew training time, in comparison with the prior art.

Figure 1:
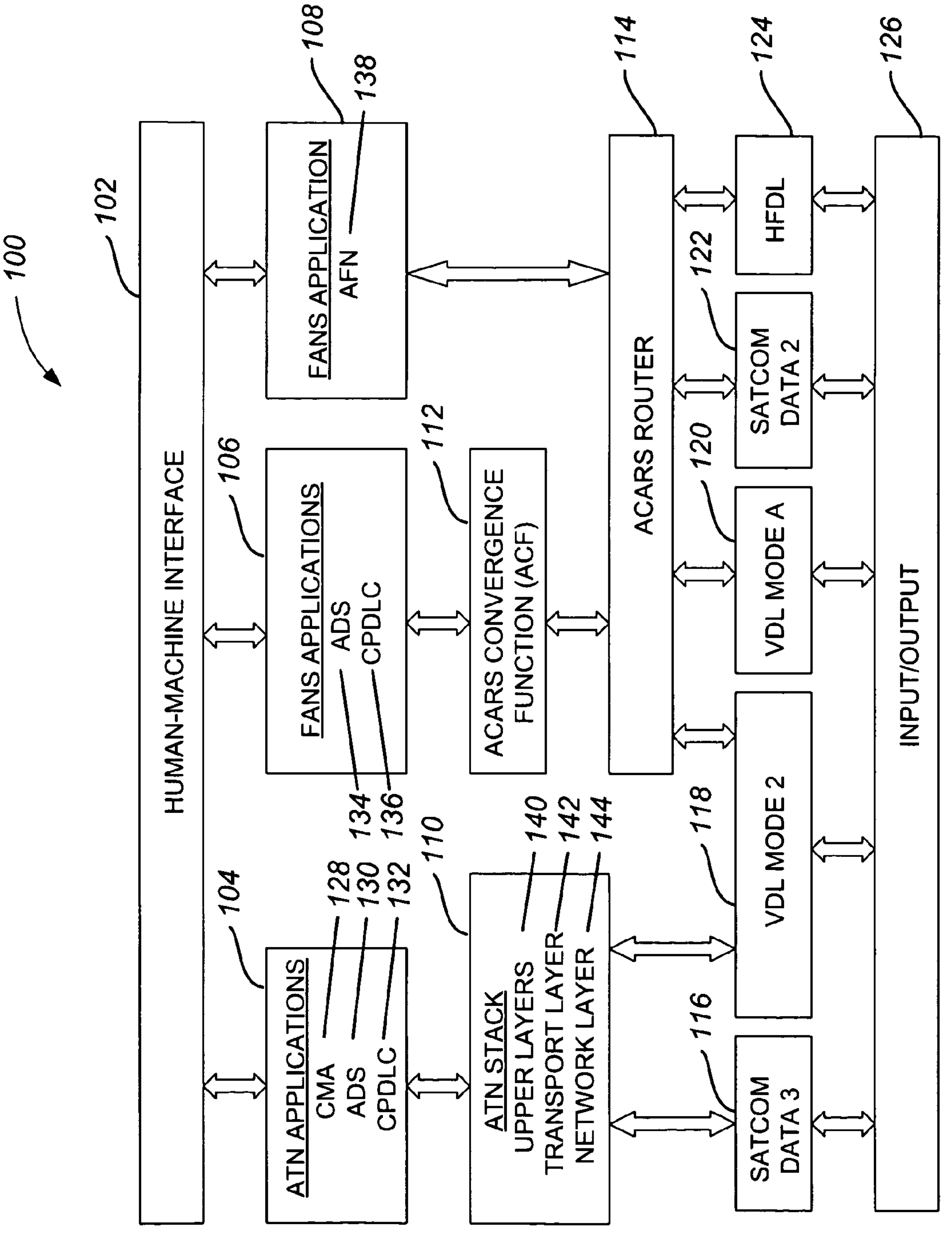
FIG. 1 is a schematic representation of the architectural concepts of a communications system in accordance with an embodiment of the invention.

FIG. 1 is a schematic representation of the dual stack architecture 100 of a single ATC operator interface communications system in accordance with an embodiment of the invention. In this embodiment, the communications system 100 includes a human-machine interface (HMI) 102 that is bi-directionally and operatively linked with each of an Aeronautical Telecommunication Network (ATN) applications component 104, a first Future Air Navigation System (FANS) applications component 106, and a second FANS application component 108. The ATN applications component 104, in turn, is bi-directionally and operatively linked to an ATN stack component 110. In this embodiment, the ATN applications component 104 includes a Context Management Application (CMA) component 128, a first Automatic Dependent Surveillance (ADS) component 130, and a first Controller/Pilot Data Link Communication (CPDLC) component 132, as described more fully below.

The ATN Stack component 110 is further bi-directionally and operatively linked to a SATCOM DATA 3 sub-network component 116 and a VHF Digital Data Link (VDL) Mode 2 sub-network component 118. The ATN stack component 110 includes upper layers 140, transport layer 142, and network layer 144. The SATCOM DATA 3 sub-network component 116 and the VDL Mode 2 sub-network component 118 are each further bi-directionally and operatively linked to an input/output component 126 that facilitates the transmission and reception of data.

As further depicted in FIG. 1, the first FANS applications component 106 is further bi-directionally and operatively linked with an Aircraft Communication Addressing and Reporting System (ACARS) Convergence function (ACF) component 112. The first FANS applications component 106 includes a second ADS component 134 and a second CPDLC component 136. Likewise, the second FANS application component 108 is also further bi-directionally and operatively linked with the ACARS Convergence Function ACF component 112. The second FANS application component 108 includes an Air Traffic Services (ATS) Facilities Notification, or AFN, component 138. The ACF component 112 is further bi-directionally and operatively linked by an ACARS router 114 with each of a VDL Mode 2 sub-network component 118, a VDL mode A sub-network component 120, a SATCOM Data 2 sub-network component 122, and a high frequency data link (HFDL) 124. Finally, the VDL Mode A sub-network component 120, the SATCOM DATA 2 sub-network component 122, and the HFDL component 124 are further bi-directionally and operatively linked to the input/output component 126.

Air traffic communications technologies described herein, which are part of the embodiment illustrated in FIG. 1, were designed to allow a choice of sub-networks to be used. VDL Mode 2 technology has been successfully used in areas where good VDL coverage is provided. The FANS is a technology used largely in oceanic regions, where SATCOM may be used primarily in a sub-network capacity. Transfers between FANS and ATN centers will therefore frequently occur either in oceanic regions, or in the overlap between oceanic and continental operations, where VDL coverage may be poor. Therefore, the ATN implementation on a dual-stack airplane as depicted in FIG. 1 may be configured to provide ATN over SATCOM Data 3.

Alternately, an ATN-over-SATCOM Data 3 connection may require the exchange of several messages to establish and maintain the connection. Therefore, to minimize operator costs, when ATN over VDL Mode 2 is available, it may be used to maintain a connection over the ATN-over SATCOM Data 3 sub-network. When VDL mode 2 becomes unavailable, the SATCOM subnetwork should be available within a pre-determined time period to allow continuity of operation. The pre-determined time period is defined as a value that will avoid the application timing out a response, or closing the ATC connection.

VDL Mode 2 may provide superior performance (message transmission times), and probably lower transmission costs, as compared to the ATN-over-SATCOM Data 3 sub-network. Therefore, when ATN over VDL Mode 2 becomes available during the use of the SATCOM subnet, the system 100 may be configured to automatically revert to using VDL Mode 2. The implementation of ATN over SATCOM allows the expansion of ATN coverage, so that operations can continue up to (or start from) the Flight Information Region (FIR) boundary when VDL coverage is less than complete (e.g. where the FIR abuts an oceanic region, such as the Atlantic). Moreover, the implementation shown in FIG. 1 may also provide continued connectivity when VHF Data Radios (VDRs) are used for voice traffic and may allow the communication management function (CMF) to maintain the CPDLC connection when VDR/system/wiring failures would otherwise cause it to switch cabinets (which would lose the CPDLC connection). Finally, the system 100 allows expansion to oceanic ATN operations.

Figure 2:
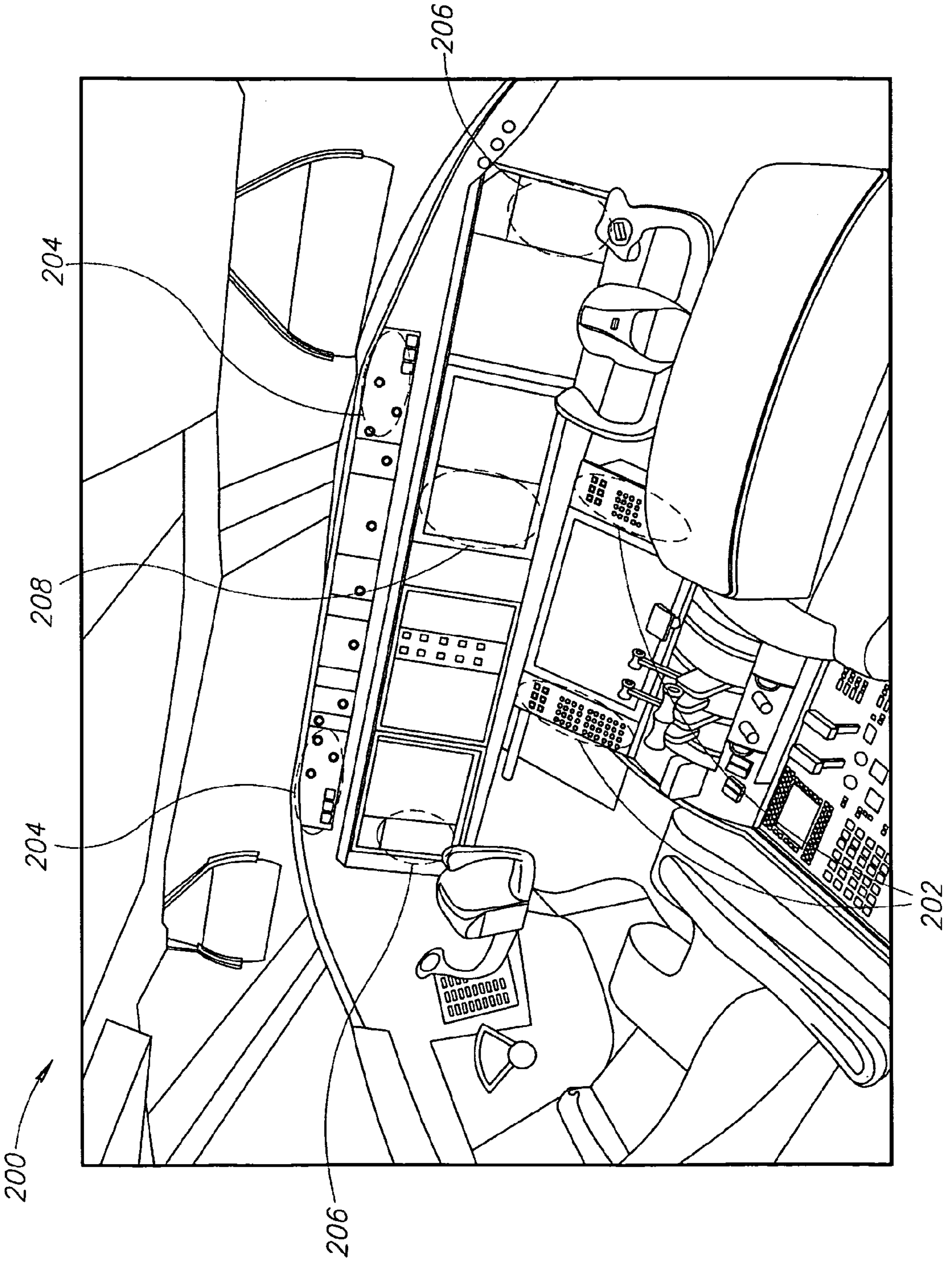
FIG. 2 is an isometric view of an aircraft cockpit equipped with a communications system in accordance with an embodiment of the invention.

FIG. 2 is an isometric view of an aircraft cockpit 200 equipped with a single ATC operator interface communications system in accordance with an embodiment of the invention. In this embodiment, the aircraft cockpit 200 is equipped with a plurality of keyboards and cursor pointers 202 for data link entry and selection, a plurality of buttons (accept, reject, cancel, etc.) 204 on the glare shield for each crew member, a plurality of automatic uplink displays 206, and at least one common user interface display 208 for ATC and Aircraft Operational Communication (AOC) data links.

Figure 3:
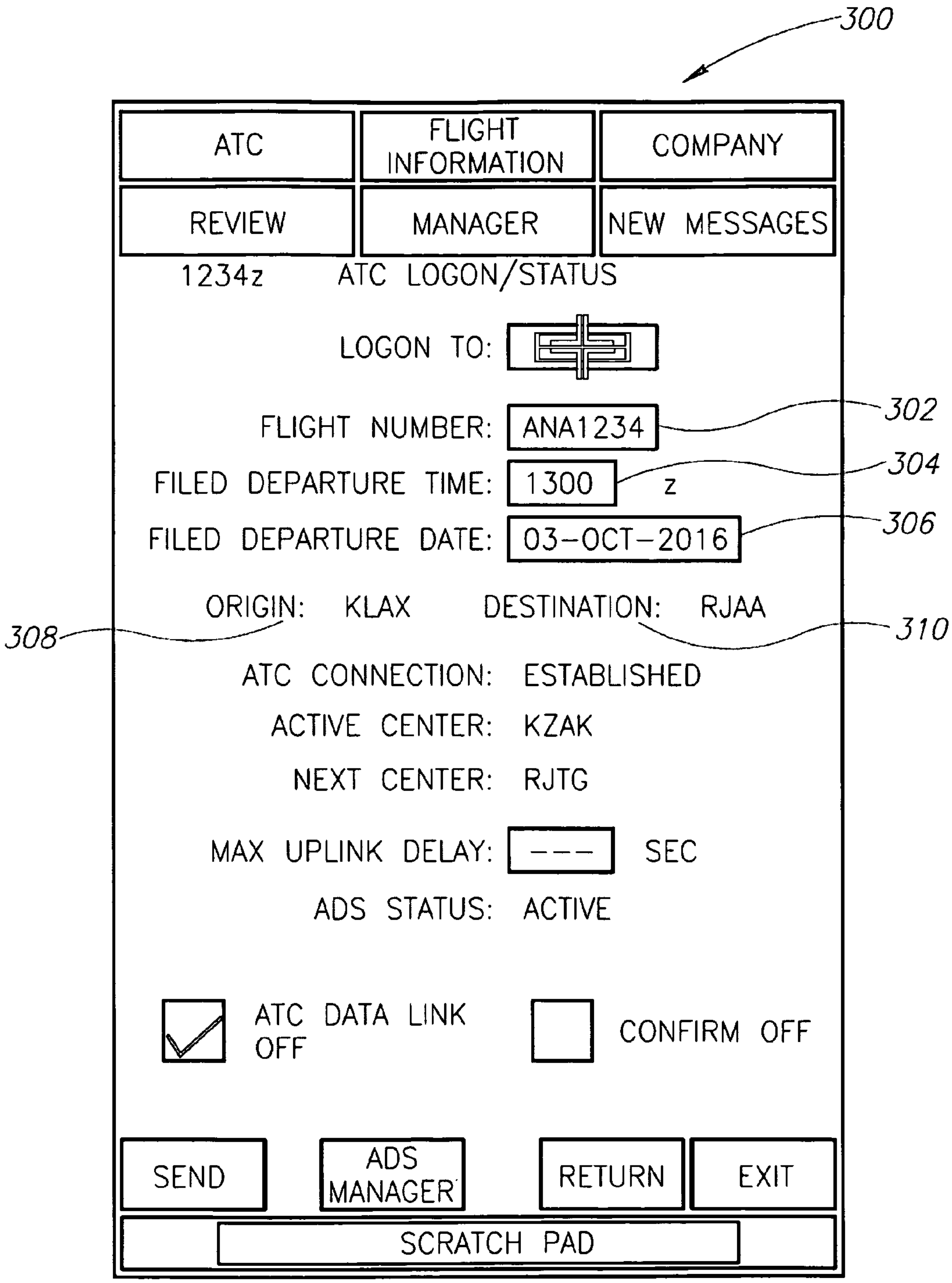
FIG. 3 is a representative screen shot of a common logon screen of the communications system in accordance with an embodiment of the invention.

FIG. 3 is a representative screen shot of the common logon screen 300 in accordance with an embodiment of the single ATC operator interface communications system 100 in FIG. 1. The common logon screen 300 is part of a common user interface (e.g. interface 102 of FIG. 1) for logging onto any Air Traffic Services Unit (ATSU). In this particular embodiment, the flight number 302, the filed departure time 304, and the filed departure date 306 are enterable, while the origin 308 and destination 310 are not enterable, but simply reflect what is in the flight plan in a Flight Management Center (FMC).

In this embodiment, the screen 300 of the system 100 may advantageously provide seamless logon to ground centers, including FANS-1/A and ATN ground centers, regardless of which type of center is receiving the logon, so that crew procedures are consistent. In order to accomplish this objective, the single ATC operator interface communications system 100 includes the common logon page 300 used for logging on to either type of ATC center. Further, the aircraft avionics includes a database that includes definitions of ATC Center type (e.g. FANS-1/A, ATN, or other types of centers) and an ATN logon address for each ATN center. A crew-entered ATC center via the screen 300 is used to determine whether the center is using FANS-1/A, ATN, or other suitable communication standard. Moreover, the crew-entered ATC center may also used in combination with the database to determine the address for an ATN logon. Based on the type of ATC center, the airplane avionics can determine whether each enterable parameter for the logon is mandatory or optional (e.g. Origin/Destination may be required for an ATN logon, but is not used for FANS-1/A). In some embodiments, it may be a local implementation decision whether to require the crew to make all entries regardless of the type of connection being established. No modifications to existing standards are necessary to support such an implementation. Once the system determines that it is to communicate with an ATN or FANS ATC (or other type) center, it simply executes the appropriate protocols (CMA or AFN respectively) for a logon to that type of ATC center.

Figure 4:
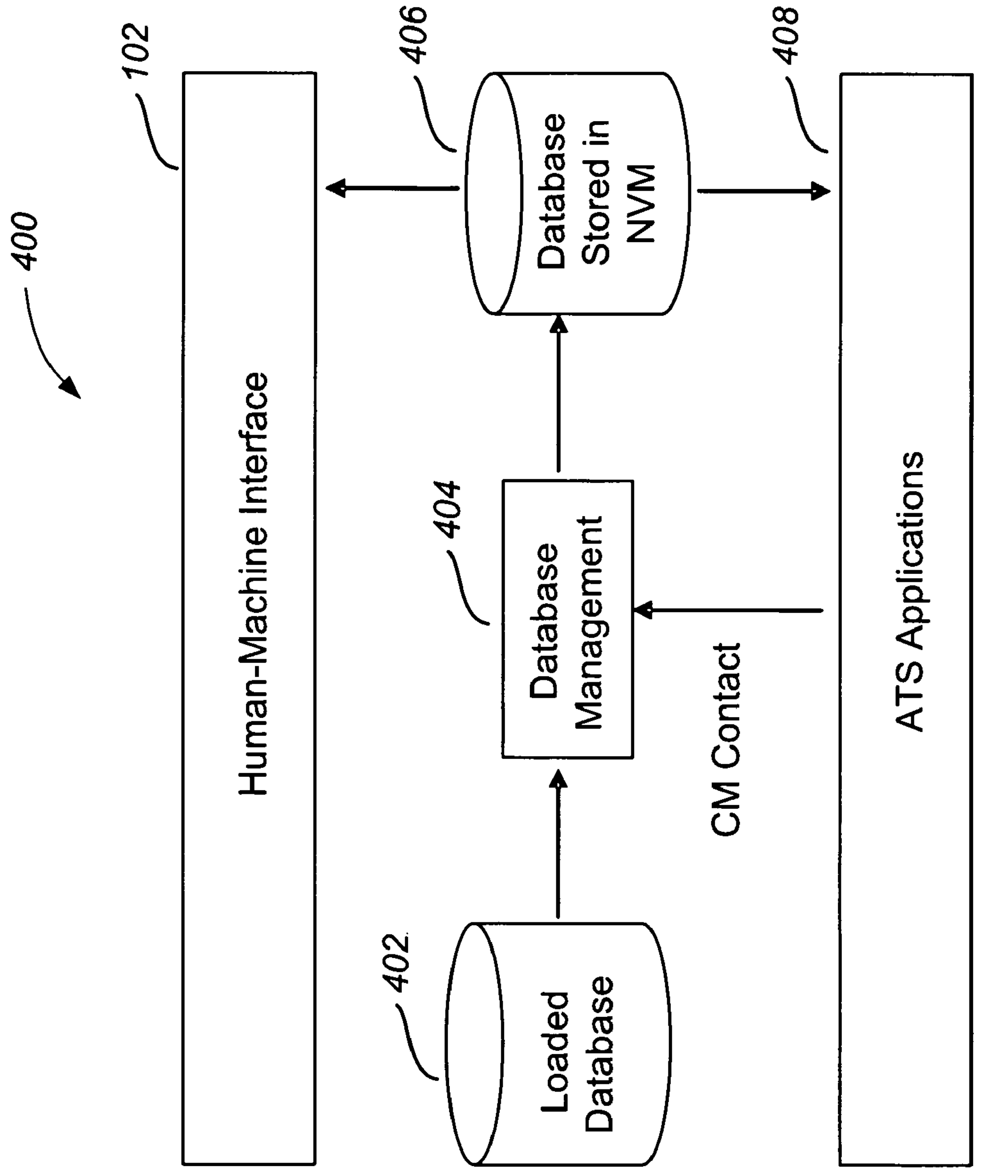
FIG. 4 is a schematic representation of an embodiment of a database system accessible by an communications system in accordance with an embodiment of the invention.

FIG. 4 is a schematic representation of an embodiment of a database system 400, accessible by the HMI 102 (FIG. 1) of the communications system 100, used to determine addressing information of a particular ATC center. If the database system 400 does not indicate that a valid address exists for a particular ATC center, the communications systems 100 will treat the ATC center as a FANS-1 ATC center. As depicted in FIG. 4, the database system 400 includes a database management component 404. An initial database 402 is loaded into the system and coupled to the database management component 404. The data in database 402 may typically be stored in non-volatile memory (NVM) 406. An ATS applications component 408 uses the data stored in NVM 406 to obtain addressing information. In the event that the data in the database 402 or the NVM 406 results in an unintended logon attempt to a valid center, the inclusion of flight ID, ICAO code, departure and destination in the logon information will result in the logon attempt being rejected.

Furthermore, the database 402 and NVM 406 can be updated by information contained in Context Management (CMA) contact messages received by the database management component 404. The database 402 and NVM 406 may also be updated by blind contact messages, that is, contact message received without having the aircraft equipped with the communications system 100 initiate a Context Management logon to an air traffic services unit (ATSU). Reloading the database 402 or the data link application software would delete any updated information, and the airplane would start with the data in the loaded database 402.

Figure 5:
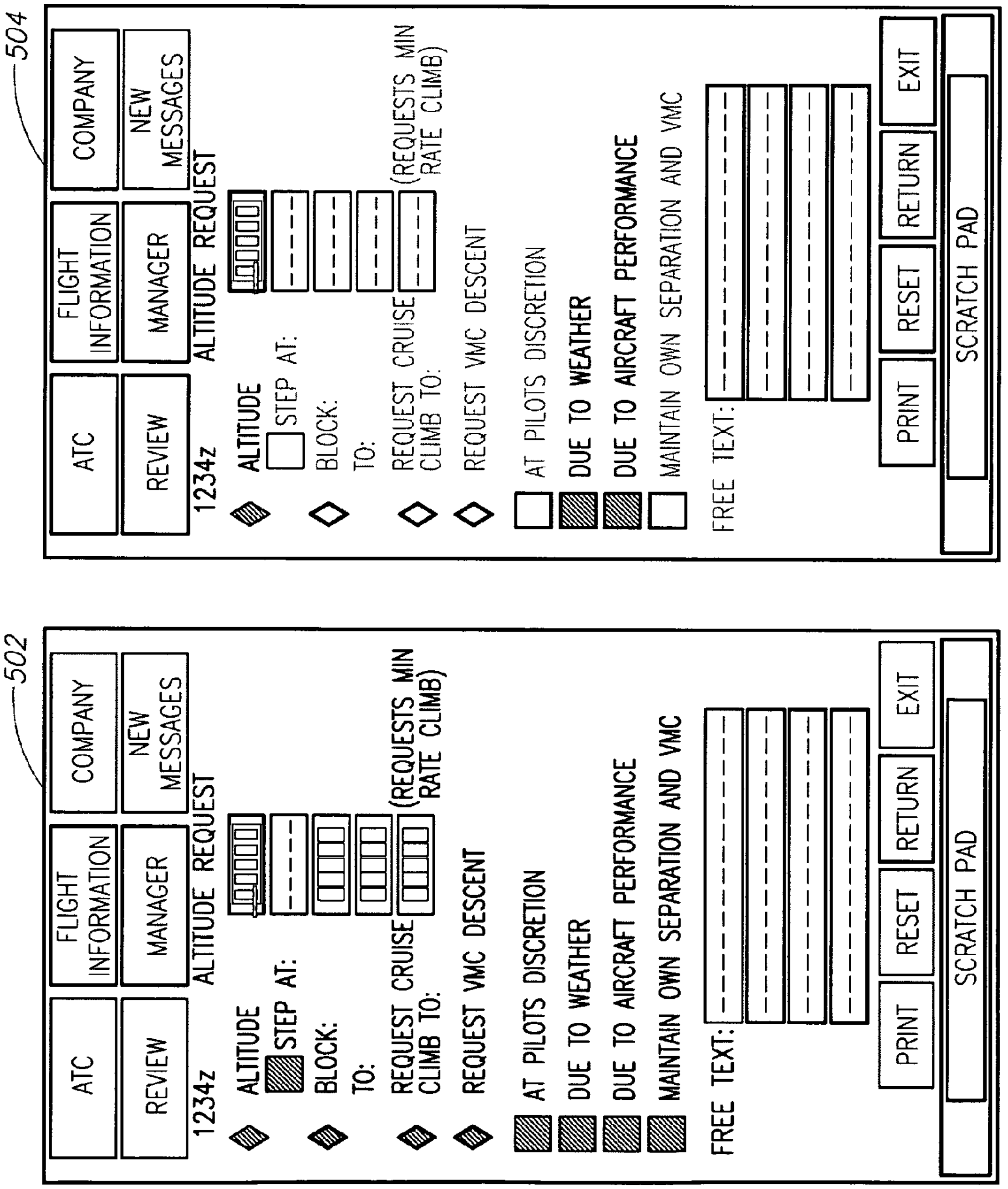
FIG. 5 shows representative screen shots of an air traffic control (ATC) downlink page adapted to each of the two data link standards in accordance with an embodiment of the invention.

FIG. 5 shows representative screen shots of an ATC downlink page adapted to each of the two data link standards in accordance with an embodiment of the invention. In this embodiment, a FANS version 502 of the page is displayed when a FANS connection exists, and an ATN version 504 of the page is displayed when an ATN connection exists. Typically, the aircrews construct ATC clearance requests and reports on a set of pages, such as on one of the downlink pages shown in FIG. 5, provided for that purpose. The requests are normally constructed using a menu that allows the aircrew to first select the general type of request they wish to create, and then a specific display for creating that type of request. For reports, a unique display page may be provided for each report, corresponding to what was requested in an uplink, or what was selected by the crew.

In the embodiments illustrated in FIG. 5, the same ATC downlink page is used to create messages for transmission to the current ATC Center, regardless of the ATC data link type (e.g. FANS-1/A, ATN, or other suitable communication standard) used by the center. Features on the downlink page that are not available for use with a selected ATC center, due to the use of a particular data link connection, may be indicated as unavailable. In other words, any selection or entry boxes used to create a particular downlink message that is not in the message set used by the current ATC data link standard (e.g. FANS-1/A or ATN) is inhibited, so that only valid messages can be constructed. This is illustrated in FIG. 5. As shown, all options are available in the FANS version 502 of the Altitude Request page. However, in the ATN version 504 of the Altitude Request page, only "Altitude" (resulting in a request for a climb or a request for descent), and two of the reasons are available for selection. The remaining selections are "cyan-ed out", or displayed in a color or style indicating to the crew that these selections cannot be made.

Nevertheless, depending on the HMI design for a particular aircraft, certain selections may result in different message elements due to the particular ATC data link standard (e.g. FANS-1/A, ATN, or other) used. An example is the use of free text for a message that is not in the allowed message type for the particular ATC data link standard.

Additionally, the names of parameters to be entered may correspond with the type of ATC connection in use (e.g. FANS-1/A or ATN). For example, FANS-1/A uses "SOULS ON BOARD", whereas ATN uses "PERSONS ON BOARD." When the aircrew requests a message be sent, a downlink message is created containing the elements requested or entered via crew selection. The elements are encoded per the respective standard for ATN or FANS. Likewise, when the downlink message is displayed as a complete message (e.g. when reselected for review after transmission or on those systems that display the completed message before transmission), the displayed message uses the appropriate message text for the type of ATC (FANS-1/A or ATN) in use. For example, the downlink message "LEVEL [altitude]", displayed when an FANS-1/A connection exists, is "MAINTAINING [level]", when an ATN connection exists.

Moreover, the message statuses used by embodiments of the invention for both FANS and ATN messages may also be consistent. In FANS, a message has a "SENDING" status while waiting for the network acknowledgement to arrive (indicating it has been received by the ground network), and then becomes "SENT". For an ATN system, the underlying protocols and independence of the upper levels from the lower levels of the stack preclude a similar mechanism. However, given the reliable link mechanisms in ATN, a simple timer may be used so that ATN messages progress to "SENDING and "SENT", just as with FANS messages. In addition, in regions where logical acknowledgment (LACK) is supported, LACK would be used instead to accomplish the same objective.

Figure 6:
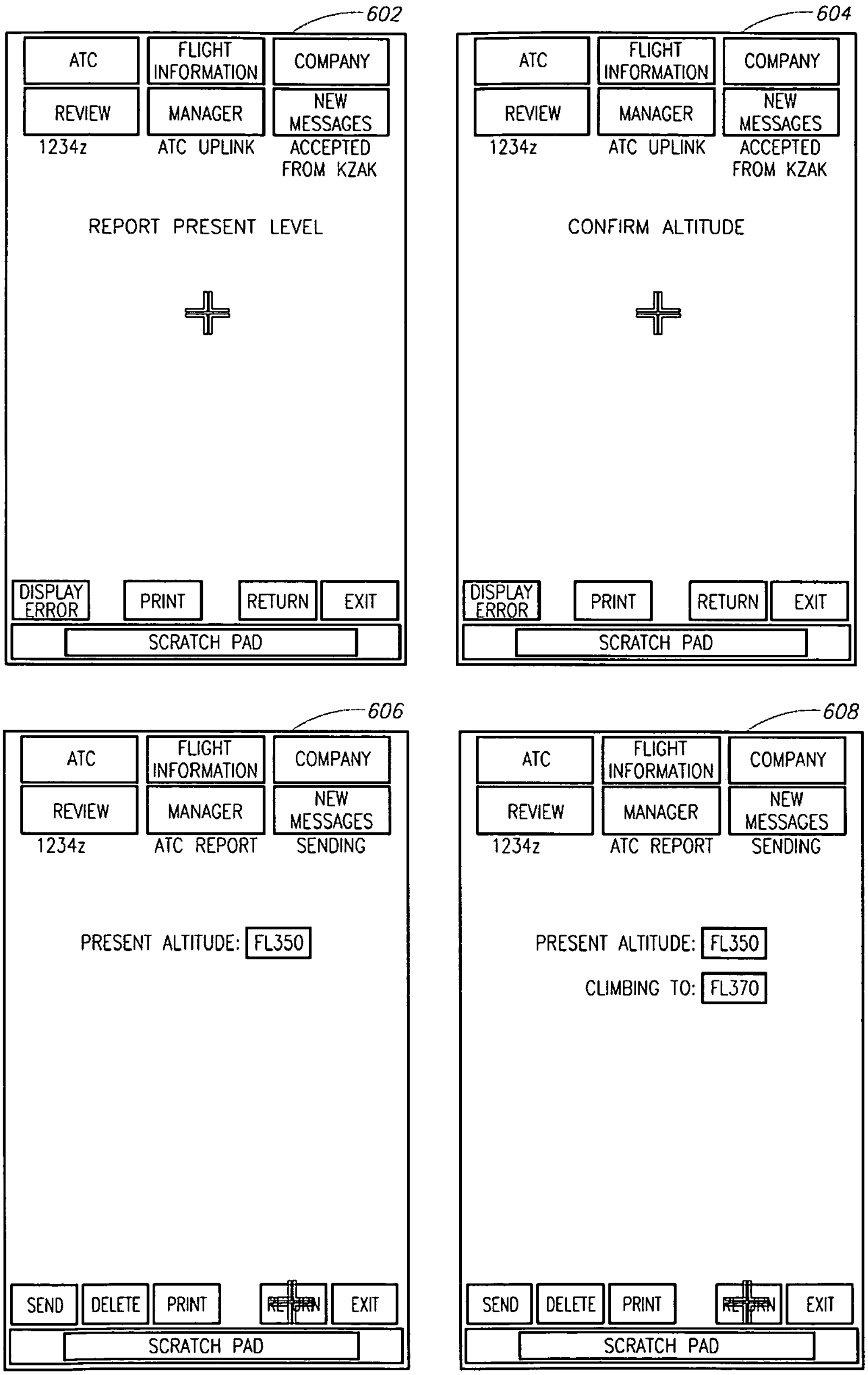
FIG. 6 shows representative screen shots of an ATC uplink page, and representative screen shots of an ATC downlink page responding to the uplink page, adapted to each of the two data link standards, in accordance with an embodiment of the invention.

FIG. 6 shows several representative screen shots of an ATC uplink display page in accordance with embodiments of the invention. As shown in FIG. 6, a common display page is used to display request messages for both FANS-1/A and ATN (or other) versions of the CPDLC. As illustrated, an ATN version 602 of the uplink display (request) page is presented when an ATN connection exists, and a FANS version 604 of the uplink display (request) page is presented when a FANS connection exists. The two versions of the uplink display page, 602 and 604, provide the same features (e.g. the ability to print a displayed uplink message, access the request that initiated it, load the clearance into the FMS or the autopilot, etc.), regardless of whether the page version is ATN or FANS-1/A (or other standard). However, the displayed uplink message is not indicated as a FANS-1/A message or an ATN message. Nevertheless, the ATC center from which an uplink message was received is indicated on each display of the message. The uplink data is decoded per RTCA DO-258/EUROCAE ED-100 (for FANS-1/A ATC uplinks), or per the respective standards for ATN, FANS, or other applicable standard.

As further shown in FIG. 6, because the uplink display page, as illustrated in versions 602 and 604, is a request page, a downlink (report) page may be provided to respond to the request in both data link standards. An ATN version 606 of this downlink (report) page is in response to the ATN version 602 (e.g. REPORT PRESENT LEVEL), and a FANS version 608 of the downlink page is in response to the FANS version 604 (e.g. CONFIRM ALTITUDE). The CLIMBING TO report appended to the FANS version 608 of the downlink (report) page conforms to current practice in FANS, and indicates that the airplane is not level at the altitude. These presentations ensure that the correct data is entered and transmitted.

Moreover, when an uplink message is displayed, the display page uses the appropriate message text for ATC data link standard (FANS-1/A or ATN) in use. This ensures that all airplanes in the airspace have a common understanding of similar clearances. While many of the uplink message elements are the same in both FANS-1/A and ATN, there are message elements that will result in different text to be displayed. A representative table 700 of some of these message elements is shown in FIG. 7. For example, as shown in FIG. 7, uplink message 20 is "CLIMB TO AND MAINTAIN [altitude]" when a FANS-1/A connection exists, but is displayed as "CLIMB TO [level]" when an ATN connection exists.

Moreover, as further shown in FIG. 7, the various report requests, uplink message 131 through 146, contain slightly different terminology, both in terms of what is reported (e.g. LEVEL rather than ALTITUDE), and in terms of the instruction used (REPORT rather than CONFIRM). However, the procedure on the aircraft is the same for REPORT or CONFIRM. As discussed earlier, regardless of the data link connection in existence (FANS-1/A, ATN, or other standard), a REPORT page is generated that is accessed directly from the uplink page, and that REPORT page contains the parameters that are to be included in the downlink report with suitable defaults.

Finally, the status indications may be the same for FANS and ATN (or other) standards. Regardless of the data link connection used to receive communications from an ATC, the status first becomes "ACCEPTING" or "REJECTING", then progresses to "ACCEPTED" or "REJECTED" on receipt of a network acknowledgement. As with downlinks, the LACK, or if LACKS are not used, a simple timer, can be used for these status indications. Finally, the time associated with the message is consistent for both data link connections ((FANS-1/A or ATN), either as time of receipt of the message, or the time it was sent. Given that the time stamp is optional in FANS standards, it may be most appropriate to use the time of receipt for all messages to provide a desired consistency.

Figure 8:
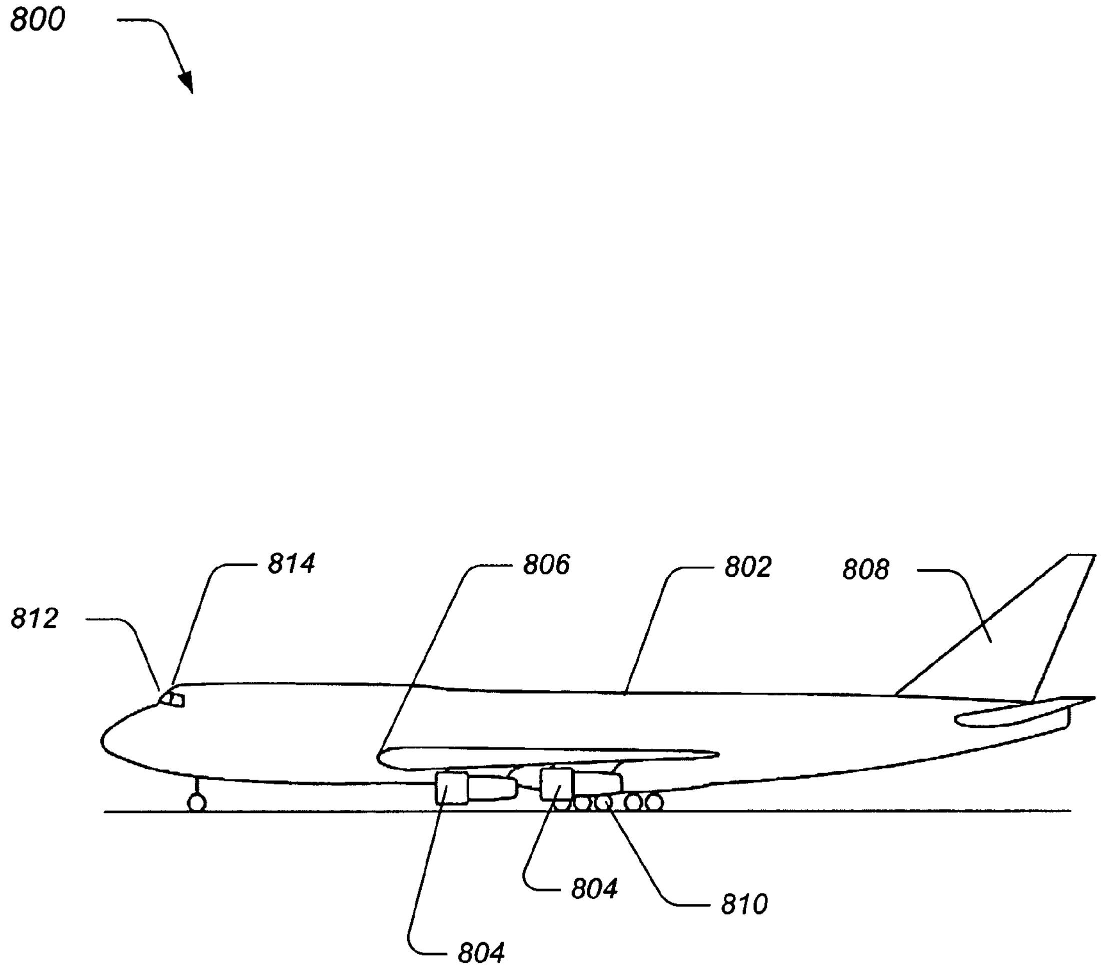
FIG. 8 is a side elevational view of an aircraft in accordance with another alternate embodiment of the invention.

Embodiments of the present invention may be used in a wide variety of aircrafts. For example, FIG. 8 is a side elevational view of an aircraft 800 in accordance with an embodiment of the present invention. In general, except for one or more systems in accordance with the present invention, the various components and subsystems of the aircraft 800 may be of known construction and, for the sake of brevity, will not be described in detail herein. As shown in FIG. 8, the aircraft 800 includes one or more propulsion units 804 coupled to a fuselage 802, wing assemblies 806 (or other lifting surfaces), a tail assembly 808, a landing assembly 810, a control system (not visible), and a host of other systems and subsystems that enable proper operation of the aircraft 800. At least one single ATC operator interface communications system 814 formed in accordance with the present invention is located within the fuselage 802, and more specifically, in a cockpit area 812. However, additional single ATC operator interface communications systems 814 and components thereof may be distributed throughout the various portions of the aircraft 800.

Although the aircraft 800 shown in FIG. 8 is generally representative of a commercial passenger aircraft, including, for example, the 737, 747, 757, 767, 777, and 787 models commercially-available from The Boeing Company of Chicago, Ill., the inventive apparatus and methods disclosed herein may also be employed in the assembly of virtually any other types of aircraft. More specifically, the teachings of the present invention may be applied to the manufacture and assembly of other passenger aircraft, cargo aircraft, rotary aircraft, and any other types of aircraft, including those described, for example, in The Illustrated Encyclopedia of Military Aircraft by Enzo Angelucci, published by Book Sales Publishers, September 2001, and in Jane's All the World's Aircraft published by Jane's Information Group of Coulsdon, Surrey, United Kingdom, which texts are incorporated herein by reference. It may also be appreciated that alternate embodiments of apparatus and methods in accordance with the present invention may be utilized in other manned aerial vehicles.

Embodiments of systems and methods in accordance with the present invention may provide significant advantages over the prior art. For example, because the communications system allows an aircrew to communicate using a plurality of different air traffic control data link standards through a common operator interface, the communications system may reduce aircrew training time. More significantly, since the communications system allows implementation of multiple air traffic control data link technologies on a single aircraft, it advantageously allows greater flexibility in the deployment of aircrafts to airspace in different geographical regions.

While embodiments of the invention have been illustrated and described above, many changes can be made without departing from the spirit and scope of the invention. Accordingly, the scope of the invention is not limited by the disclosure of these embodiments. Instead, the invention should be determined entirely by reference to the claims that follow.

What is claimed is:

1. A method for communication utilizing a plurality of data link standards, comprising:

selecting one of the plurality of data link standards from a database based on an inputted identity of an air traffic control center;

establishing communication with the air traffic control center by initiating a logon using the selected data link standard;

formatting at least one downlink page to only allow appropriate data inputs based on one or more functionalities of the selected data link standard;

encoding one or more entered data inputs based on the selected data link standard;

transmitting the one or more encoded data inputs to the air traffic control center, and displaying each of the encoded data inputs in a corresponding text message according to one or more message text conventions of the selected data link standard.

2. The method of claim 1, further comprising:

receiving one or more uplink data transmissions encoded based on the selected data link standard from the air traffic control center;

decoding the one or more uplink data transmissions based on the selected data link standard; and displaying each of the decoded uplink data transmissions in a text message on a corresponding uplink display page according to one or more message text conventions of the selected data link standard.

3. The method of claim 1, wherein the selecting one the plurality of data link standards from a database for communication with an air traffic control center includes selecting one of a FANS data link standard and an ATN data link standard.

4. The method of claim 1, wherein selecting one of the plurality of data link standards from a database based on the inputted identity of the air traffic control center includes determining the data link standard from a database including one or more entries of air traffic control centers and corresponding data link standards, and wherein the entries are at least one of pre-loaded, created via at least one Context Management uplink, and created via at least one blind contact message.

5. The method of claim 4, wherein selecting one of the plurality of data link standards from a database based on the inputted identity of the air traffic control center includes selecting an FANS standard when the database does not indicate the air traffic control center is using an ATN standard.

6. The method of claim 1, wherein formatting at least one downlink page to only allow one or more appropriate data inputs based on one or more functionalities of the selected data link standard includes formatting each of the downlink page for one of a crew-initiated request, a report responding to one or more requests in an uplink page, and a crew-initiated report.

7. The method of claim 1, wherein transmitting the one or more encoded data inputs to the air traffic control center includes displaying transmission status indications, and receiving one or more uplink data transmission encoded by the selected data link standard includes displaying reception status indications.

8. A system for communication via a plurality of data link standards, comprising:

a selector component configured to select one of the plurality of data link standards from a database for communication based on an inputted identity of an air traffic control center;

an initiator component configured to establish communication with the air traffic control center using the selected data link standard;

a adapter component configured to format at least one downlink page to only allow appropriate data inputs based on one or more functionalities of the selected data link standard;

an encoder component configured to encode one or more entered downlink data inputs based on the selected data link standard a transmitter component configured to transmit the one or more encoded data inputs to the air traffic control center; and a display component configured to display each of the decoded uplink data transmissions in a text message on a corresponding uplink display page according to one or more message text conventions of the selected data link standard.

9. The system of claim 8, further comprising:

a receiver component configured to receive one or more uplink data transmissions encoded by the selected data link standard from the air traffic control center; and a decoder component configured to decode the one or more uplink data transmissions based on the selected data link standard.

10. The system of claim 8, wherein the selector component is further configured to select one of a FANS standard and an ATN standard.

11. The system of claim 9, wherein the display component is further configured to display the one or more downlink data inputs in one or more corresponding text messages according to one or more message text conventions of the selected data link standard.

12. The system of claim 8, wherein the selector component is further configured to determine a data link standard from a database including one or more entries of air traffic control centers and corresponding data link standards, wherein the entries are at least one of pre-loaded, created via at least one Context Management uplink, and created via at least one blind contact message.

13. The system of claim 12, wherein the selector component is further configured to establish communication with an air traffic control center by a FANS standard when the database does not indicate the air traffic control center is using an ATN standard.

14. The system of claim 8, wherein the adapter component is further configured to format the downlink page for one of a crew-initiated request, a report responding to one or more requests in an uplink page, and a crew-initiated report.

15. The system of claim 9 wherein and the display component is configured to display transmission and reception status indications.

16. An aircraft, comprising:

a system for communication via a plurality of data link standards, comprising:

a selector component configured to select one of the plurality of data link standards from a database based on an inputted identity of an air traffic control center;

an initiator component configured to establish communication with the air traffic control center using the selected data link standard;

an adapter component configured to format at least one downlink page to only allow appropriate data inputs based on one or more functionalities of the selected data link standard;

an encoder component configured to encode one or more entered downlink data inputs based on the selected data link standard;

a transmitter component configured to transmit the one or more encoded data inputs to the air traffic control center; and a display component configured to display each of the decoded uplink data transmission in a text message on a corresponding uplink display page according to one or more message text conventions of the selected data link standard.

17. The aircraft of claim 16, comprising:

a system for communication via a plurality of data link standards, further comprising:

a receiver component configured to receive one or more uplink data transmission encoded by the selected data link standard from the air traffic control center;

a decoder component configured to decode one or more uplink data transmissions from an air traffic control center based on the selected data link standard.

18. The aircraft of claim 16, wherein the selector component is further configured to select one of a FANS standard and an ATN standard.

19. The aircraft of claim 16, wherein the selector component is further configured to determine a data link standard from a database including one or more entries of air traffic control centers and corresponding data link standards, wherein the entries are at least one of pre-loaded, created via at least one Context Management uplink, and created via at least one blind contact message.

20. The method of claim 1, further comprising defaulting to a FANS standard when the database does not indicate a valid address for the inputted air traffic control center.

* * * * *